US008666628B2

(12) United States Patent
Noguchi et al.

(10) Patent No.: US 8,666,628 B2
(45) Date of Patent: Mar. 4, 2014

(54) TORQUE DISTRIBUTION CONTROL APPARATUS FOR FOUR-WHEEL DRIVE VEHICLE AND FOUR-WHEEL DRIVE VEHICLE HAVING THE SAME

(75) Inventors: Masatoshi Noguchi, Wako (JP); Nor Hairuddin, Wako (JP); Yusuke Sakaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 759 days.

(21) Appl. No.: 12/824,216

(22) Filed: Jun. 27, 2010

(65) Prior Publication Data

US 2011/0035130 A1 Feb. 10, 2011

(30) Foreign Application Priority Data

Aug. 5, 2009 (JP) ................................ 2009-182213

(51) Int. Cl.
*B60T 8/1755* (2006.01)

(52) U.S. Cl.
USPC ............................................... 701/89; 701/72

(58) Field of Classification Search
USPC ...................................................... 701/89, 72
See application file for complete search history.

(56) References Cited

U.S. PATENT DOCUMENTS

| | | | | |
|---|---|---|---|---|
| 2004/0059494 | A1 * | 3/2004 | Yoneda | 701/89 |
| 2010/0030443 | A1 * | 2/2010 | Okamoyo | 701/72 |

FOREIGN PATENT DOCUMENTS

| | | | |
|---|---|---|---|
| JP | 63-12863 | | 1/1988 |
| JP | 63-38624 | | 2/1988 |
| JP | 02-308933 | | 12/1990 |
| JP | 05-096966 | | 4/1993 |
| JP | 3603569 | | 5/1999 |
| JP | 11278082 | A * | 10/1999 |
| JP | 2004-189228 | | 7/2004 |
| JP | 2005300556 | A * | 10/2005 |
| JP | 2006-056444 | | 3/2006 |

OTHER PUBLICATIONS

English Translation of JP 2005-300556.*
JP 11278082 A JPO english translation.*
Japanese Office Action for corresponding JP Application No. 2009-182213, Jun. 28, 2011.
JP 11278082 A JPO english translation Oct. 1999.

* cited by examiner

*Primary Examiner* — Fadey S Jabr
*Assistant Examiner* — Yazan A Soofi
(74) *Attorney, Agent, or Firm* — Ditthavong Mori & Steiner, P.C.

(57) ABSTRACT

A torque distribution control apparatus for a four-wheel drive vehicle includes a vehicle-speed detector configured to detect a vehicle speed of the vehicle. A wheel-speed detector is configured to detect wheel speeds of main driving wheels and sub-driving wheels of the vehicle. A sub-driving-wheel distribution-torque calculator is configured to calculate a sub-driving-wheel distribution torque in accordance with a rotation speed difference between the main driving wheels and the sub-driving wheels calculated based on an output from the wheel-speed detector. A torque limiter is configured to limit an upper limit of the sub-driving-wheel distribution torque. A controller is configured to control the sub-driving-wheel distribution torque to be transmitted to the right and left sub-driving wheels by right and left torque distribution clutches in accordance with a driving state of the vehicle.

18 Claims, 5 Drawing Sheets

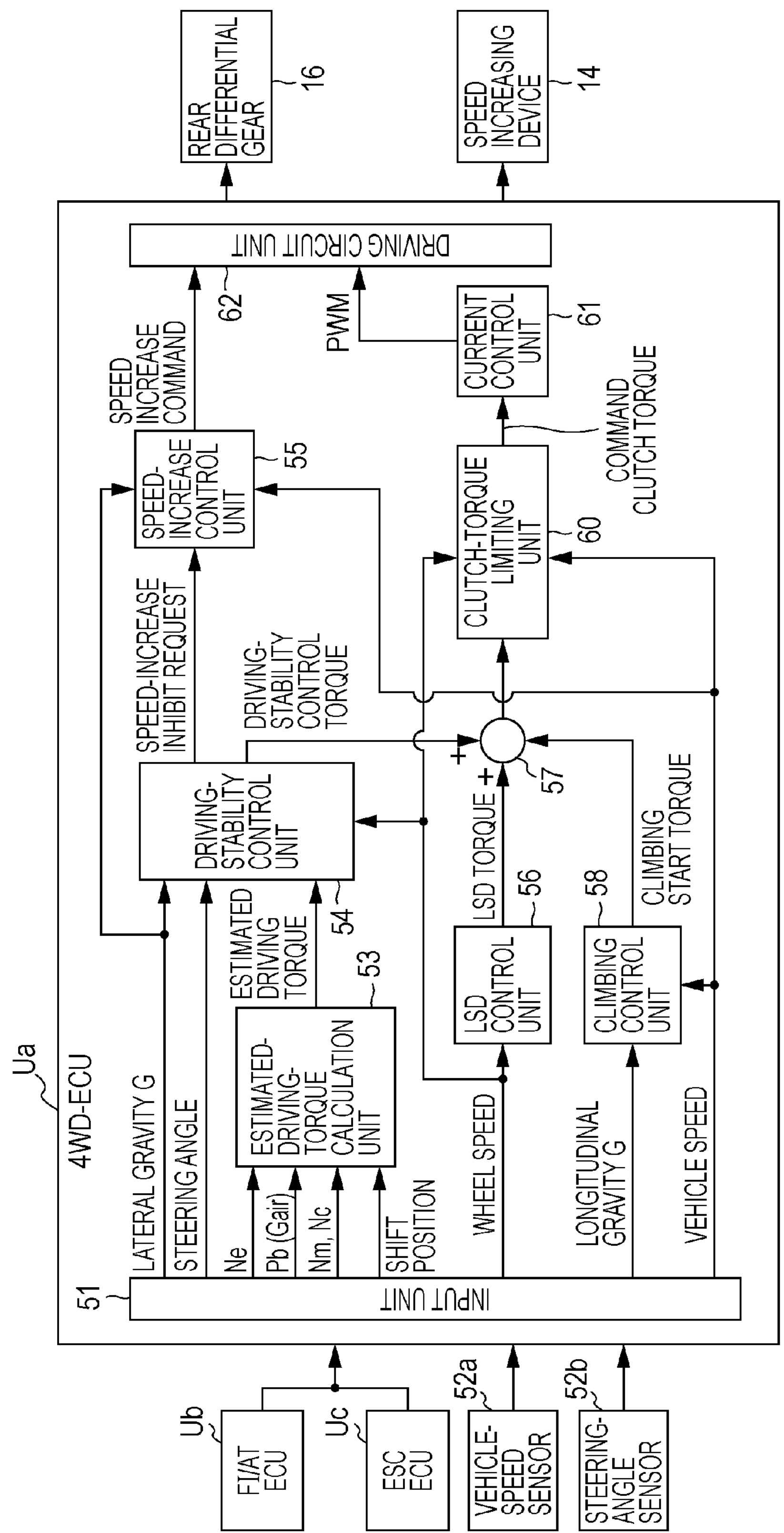
FIG. 3
REAR DIFFERENTIAL GEAR
16
SPEED INCREASING DEVICE
14
DRIVING CIRCUIT UNIT
62
PWM
CURRENT CONTROL UNIT
61
SPEED INCREASE COMMAND
SPEED-INCREASE CONTROL UNIT
55
COMMAND CLUTCH TORQUE
CLUTCH-TORQUE LIMITING UNIT
60
SPEED-INCREASE INHIBIT REQUEST
DRIVING-STABILITY CONTROL TORQUE
+
+
57
DRIVING-STABILITY CONTROL UNIT
54
LSD TORQUE
56
58
CLIMBING START TORQUE
ESTIMATED DRIVING TORQUE
53
LSD CONTROL UNIT
CLIMBING CONTROL UNIT
Ua
4WD-ECU
LATERAL GRAVITY G
STEERING ANGLE
Ne
Pb (Gair)
Nm, Nc
SHIFT POSITION
ESTIMATED-DRIVING-TORQUE CALCULATION UNIT
WHEEL SPEED
LONGITUDINAL GRAVITY G
VEHICLE SPEED
51
INPUT UNIT
Ub
FI/AT ECU
Uc
ESC ECU
52a
VEHICLE-SPEED SENSOR
52b
STEERING-ANGLE SENSOR

TORQUE DISTRIBUTION CONTROL APPARATUS FOR FOUR-WHEEL DRIVE VEHICLE AND FOUR-WHEEL DRIVE VEHICLE HAVING THE SAME

CROSS REFERENCES TO RELATED APPLICATIONS

The present application claims priority under 35 U.S.C. §119 to Japanese Patent Application No. 2009-182213, filed Aug. 5, 2009, entitled "Torque Distribution Control Device for Four-Wheel Drive Vehicle." The contents of this application are incorporated by reference in their entirety.

BACKGROUND OF THE INVENTION

1. Field of the Invention

The present invention relates to a torque distribution control apparatus for a four-wheel drive vehicle and a four-wheel drive vehicle having the torque distribution control apparatus.

2. Description of the Related Art

Japanese Patent No. 3603569 discloses that driving force output from an engine is transmitted to a transmission via a clutch and driving force output from the transmission is transmitted to driving wheels via a power transmission system such as a differential gear. When a quick acceleration request is made by the driver, the engine speed or the engine output torque is limited so as to prevent the differential gear from damage.

When front wheels serving as main driving wheels slip and a rotation speed difference is produced between the front wheels and rear wheels serving as sub-driving wheels at the start of a four-wheel drive vehicle, driving-force distribution clutches in the rear differential gear are engaged to distribute the driving torque to the rear wheels. Thereby, the driving torque to be distributed to the front wheels is reduced to suppress the slip, and traction is produced in the rear wheels so that the vehicle can start moving. If an actual driving torque produced in the rear wheels by engagement of the torque distribution clutches excessively increases, the load on the rear differential gear increases, and this may reduce durability.

By limiting the engine speed or the engine output torque, as in the invention of Japanese Patent No. 3603569, the driving torque to be distributed to the rear wheels can be reduced and the rear differential gear can be protected. In this case, unfortunately, the total traction of the front wheels and the rear wheels decreases, and this reduces starting performance of the vehicle.

SUMMARY OF THE INVENTION

According to an aspect of the present invention, a torque distribution control apparatus for a four-wheel drive vehicle includes a vehicle-speed detector, a wheel-speed detector, a sub-driving-wheel distribution-torque calculator, a torque limiter, and a controller. The vehicle-speed detector is configured to detect a vehicle speed of the four-wheel drive vehicle. The four-wheel drive vehicle includes right and left main driving wheels to which a driving torque output from a driving source is directly transmitted, and right and left sub-driving wheels to which the driving torque is transmitted via right and left torque distribution clutches. The wheel-speed detector is configured to detect wheel speeds of the main driving wheels and the sub-driving wheels. The sub-driving-wheel distribution-torque calculator is configured to calculate a sub-driving-wheel distribution torque in accordance with a rotation speed difference between the main driving wheels and the sub-driving wheels calculated based on an output from the wheel-speed detector. The torque limiter is configured to limit an upper limit of the sub-driving-wheel distribution torque when the sub-driving-wheel distribution torque calculated by the sub-driving-wheel distribution-torque calculator is higher than or equal to a first predetermined value, both a rotation speed difference of the left torque distribution clutch and a rotation speed difference of the right torque distribution clutch are larger than or equal to a second predetermined value, and the vehicle speed detected by the vehicle-speed detector is lower than or equal to a third predetermined value. The controller is configured to control the sub-driving-wheel distribution torque to be transmitted to the right and left sub-driving wheels by the right and left torque distribution clutches in accordance with a driving state of the vehicle.

According to another aspect of the present invention, a four-wheel drive vehicle includes right and left main driving wheels, right and left sub-driving wheels, and a torque distribution control apparatus. To the right and left main driving wheels, a driving torque output from a driving source is directly transmitted. To the right and left sub-driving wheels, the driving torque is transmitted via right and left torque distribution clutches. The torque distribution control apparatus includes a vehicle-speed detector, a wheel-speed detector, a sub-driving-wheel distribution-torque calculator, a torque limiter, and a controller. The vehicle-speed detector is configured to detect a vehicle speed of the four-wheel drive vehicle. The wheel-speed detector is configured to detect wheel speeds of the main driving wheels and the sub-driving wheels. The sub-driving-wheel distribution-torque calculator is configured to calculate a sub-driving-wheel distribution torque in accordance with a rotation speed difference between the main driving wheels and the sub-driving wheels calculated based on an output from the wheel-speed detector. The torque limiter is configured to limit an upper limit of the sub-driving-wheel distribution torque when the sub-driving-wheel distribution torque calculated by the sub-driving-wheel distribution-torque calculator is higher than or equal to a first predetermined value, both a rotation speed difference of the left torque distribution clutch and a rotation speed difference of the right torque distribution clutch are larger than or equal to a second predetermined value, and the vehicle speed detected by the vehicle-speed detector is lower than or equal to a third predetermined value. The controller is configured to control the sub-driving-wheel distribution torque to be transmitted to the right and left sub-driving wheels by the right and left torque distribution clutches in accordance with a driving state of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram of a four-wheel drive electronic control unit;

DESCRIPTION OF THE EMBODIMENTS

An embodiment of the present invention will be described below with reference to FIGS. 1 to 5.

Figure 1:
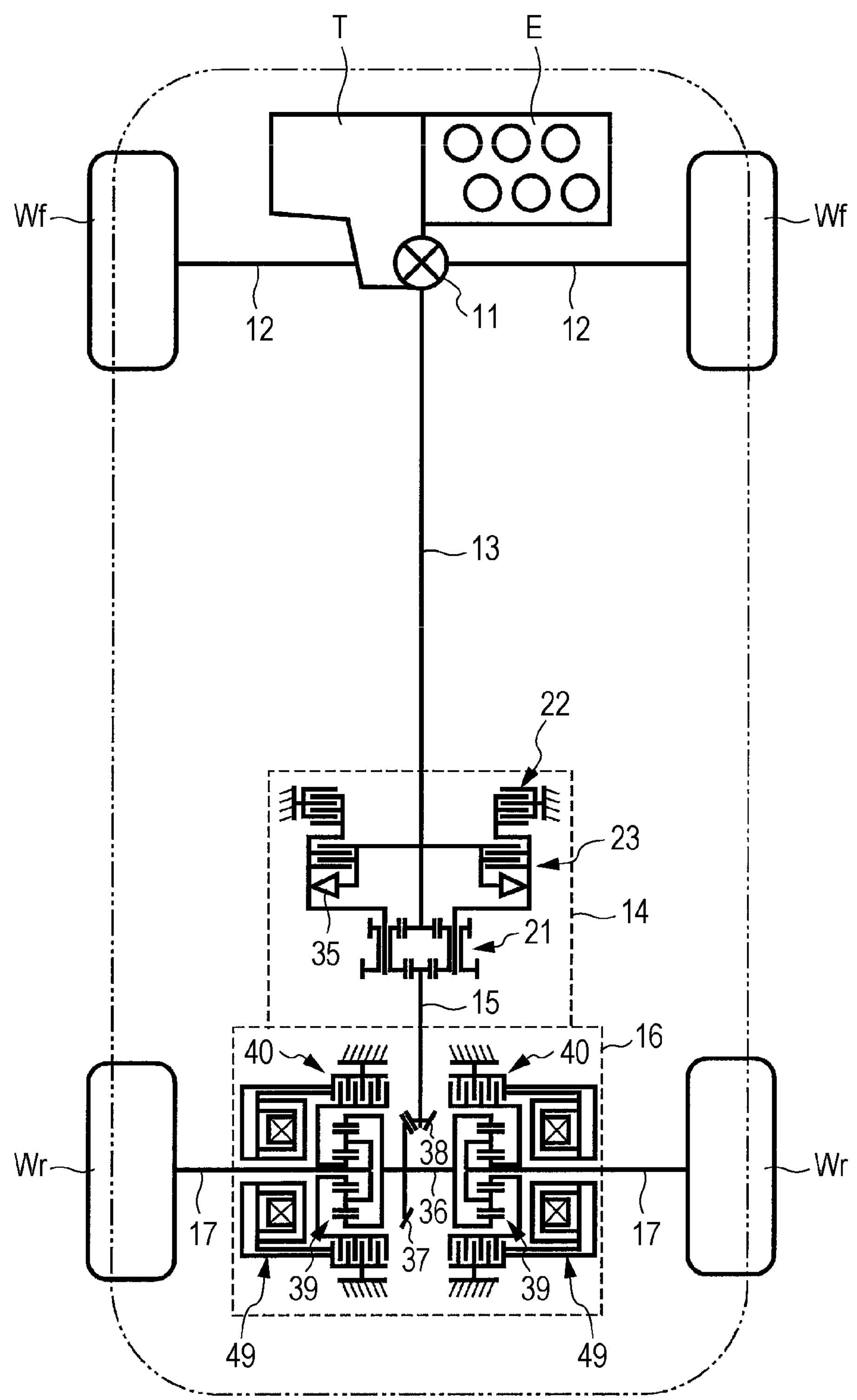
FIG. 1 illustrates a driving-force transmission system of a four-wheel drive vehicle.

Referring to FIG. 1, a four-wheel drive vehicle to which the embodiment of the present invention is applied includes right and left front wheels Wf serving as main driving wheels, and right and left rear wheels Wr serving as sub-driving wheels. Basically, during driving of the vehicle, the right and left front wheels Wf are constantly driven, and the right and left rear wheels Wr are appropriately driven in accordance with a driving state of the vehicle.

An automatic transmission T is connected to an engine E that is transversely mounted at the front of a vehicle body, and is also connected to the right and left front wheels Wf via a front differential gear 11 and right and left front drive shafts 12. The front differential gear 11 is connected to the right and left rear wheels Wr via a transfer (not shown), a front propeller shaft 13, a speed-increasing device 14, a rear propeller shaft 15, a rear differential gear 16, and right and left rear drive shafts 17.

Figure 2:
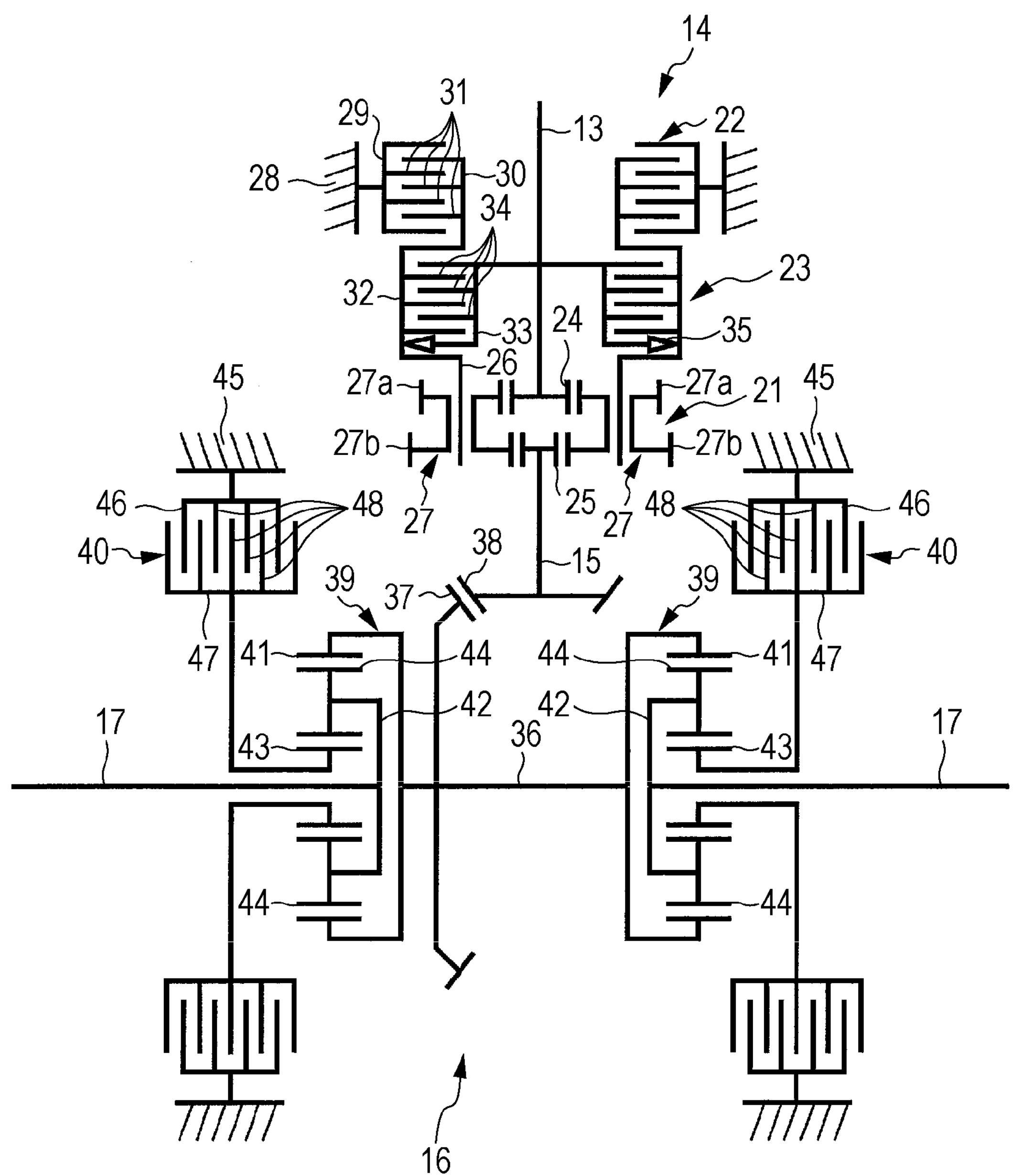
FIG. 2 is an enlarged view of a speed-increasing device and a rear differential gear.

As shown in FIG. 2, the speed-increasing device 14 includes a planetary gear mechanism 21, a speed-increasing clutch 22, and a directly-coupled clutch 23.

The planetary gear mechanism 21 includes an input-side sun gear 24 fixed to a rear end of the front propeller shaft 13, an output-side sun gear 25 fixed to a front end of the rear propeller shaft 15, a carrier 26, and a plurality of double pinions 27 supported by the carrier 26. Each double pinion 27 has an input-side pinion 27*a* and an output-side pinion 27*b* provided integrally. The number of teeth of the output-side pinion 27*b* is set to be larger than the number of teeth of the input-side pinion 27*a*. Correspondingly, the number of teeth of the output-side sun gear 25 is set to be smaller than the number of teeth of the input-side sun gear 24.

The speed-increasing clutch 22 is of a hydraulic multi-plate type. In the speed-increasing clutch 22, a clutch outer 29 fixed to a housing 28 and a clutch inner 30 provided on an inner side of the clutch outer 29 oppose with a plurality of frictional engaging elements 31 being disposed therebetween. When the frictional engaging elements 31 are engaged by the supply of hydraulic pressure, the clutch inner 30 is engaged with the clutch outer 29 and is thereby restrained by the housing 28 so as not to rotate.

The directly-coupled clutch 23 is of a hydraulic multi-plate type, and includes a clutch outer 32 provided integrally with the clutch inner 30 of the speed-increasing clutch 22 and the carrier 26 of the planetary gear mechanism 21, a clutch inner 33 provided integrally with the front propeller shaft 13, a plurality of frictional engaging elements 34 provided between the clutch outer 32 and the clutch inner 33, and a one-way clutch 35 provided between the clutch outer 32 and the clutch inner 33. When the rotation speed of the clutch inner 33 exceeds the rotation speed of the clutch outer 32, the one-way clutch 35 slips to block transmission of the driving force. When the frictional engaging elements 34 are engaged by the supply of hydraulic pressure, the clutch outer 32 is engaged with the clutch inner 33, so that the front propeller shaft 13 is combined with the carrier 26 of the planetary gear mechanism 21.

Accordingly, when the speed-increasing clutch 22 is engaged and the directly-coupled clutch 23 is disengaged, the carrier 26 of the planetary gear mechanism 21 is restrained by the housing 28 so as to not to rotate. Hence, the rotation speed of the front propeller shaft 13 is increased by the speed increasing ratio (e.g., 1.05) determined by the numbers of teeth of the input-side sun gear 24, the output-side sun gear 25, and the double pinions 27, and the increased rotation speed is output to the rear propeller shaft 15.

Conversely, when the speed-increasing clutch 22 is disengaged and the directly-coupled clutch 23 is engaged, the input-side sun gear 24 and the carrier 26 of the planetary gear mechanism 21 are combined into a lock state, so that the rotation of the front propeller shaft 13 is output to the rear propeller shaft 15 without any change.

Since the rear differential gear 16 has a structure that is substantially symmetrical with respect to the vehicle center plane in the front-right direction, only a structure of a part on the left side of the vehicle center plane will be described below.

A driven bevel gear 37 is fixed to a center portion of an input shaft 36 coaxially provided between opposing ends of the left and rear drive shafts 17, and engages with a driving bevel gear 38 fixed to a rear end of the rear propeller shaft 15. Between the input shaft 36 and the left rear drive shaft 17, a planetary gear mechanism 39 and an electromagnetic multi-plate torque distribution clutch 40 are provided.

The planetary gear mechanism 39 includes a ring gear 41, a carrier 42, a sun gear 43, and a plurality of pinions 44 that are supported by the carrier 42 and simultaneously engage with the ring gear 41 and the sun gear 43. The ring gear 41 is coupled to a left end of the input shaft 36, and the carrier 42 is coupled to a right end of the left rear drive shaft 17.

The torque distribution clutch 40 includes a clutch outer 46 fixed to a housing 45, a clutch inner 47 coupled to the sun gear 43 in the planetary gear mechanism 39, a plurality of frictional engaging elements 48 provided between the clutch outer 46 and the clutch inner 47, and an electromagnetic actuator 49 (see FIG. 1) that engages the frictional engaging elements 48 so as to combine the clutch outer 46 and the clutch inner 47.

In a state in which the electromagnetic actuator 49 is off, the torque distribution clutch 40 is disengaged, and therefore, the sun gear 43 is freely movable. Hence, the driving force of the input shaft 36 is not transmitted to the left rear drive shaft 17. In contrast, in a state in which the electromagnetic actuator 49 is on and the torque distribution clutch 40 is engaged, the sun gear 43 is restrained by the housing 45 so as to not to rotate. Hence, the driving force of the input shaft 36 is transmitted to the left rear drive shaft 17.

In this case, when the slip amount of the torque distribution clutch 40 is changed by changing the current to be supplied to the electromagnetic actuator 49, the torque to be transmitted from the input shaft 36 to the left rear drive shaft 17 can be changed continuously.

Accordingly, by changing the engaging forces of the right and left torque distribution clutches 40 of the rear differential gear 16, the ratio of torques distributed between the front wheels Wf and the rear wheels Wr can be arbitrarily controlled, and the ratio of torques distributed between the right and left rear wheels Wr can be controlled arbitrarily.

Next, a description will be given of a four-wheel drive (4 WD) electronic control unit Ua for controlling operations of the speed-increasing device 14 and the rear differential gear 16, with reference to FIG. 3.

An FI/AT electronic control unit Ub for controlling the operations of the engine E and the automatic transmission T and an electronic stability control (ESC) electronic control unit Uc for controlling the operation of a vehicle-behavior stabilization system are connected via a controller area network (CAN) to an input unit 51 of the 4 WD electronic control unit Ua. Further, a vehicle-speed sensor 52*a* for detecting the vehicle speed, for example, from the rotation speed of a gear in the automatic transmission T, and a steering-angle sensor 52*b* for detecting the steering angle of a steering wheel are connected to the input unit 51.

Signals input from the FI/AT electronic control unit Ub to the input unit 51 include the engine speed, suction negative pressure, rotation speeds of a main shaft and a countershaft of the automatic transmission T, and shift position of the automatic transmission T. Further, signals input from the ESC electronic control unit Uc to the input unit 51 include the wheel speeds of the front wheels Wr and the rear wheels Wr, lateral acceleration of the vehicle, and longitudinal acceleration of the vehicle.

An estimated-driving-torque calculation unit 53 calculates an estimated driving torque output from the transmission T on the basis of the engine speed, the suction negative pressure (or suction flow rate), the gear ratio estimated from the rotation speeds of the main shaft and the countershaft, the speed ratio of a torque converter, and efficiencies of the gear stages, which are input from the input unit 51. Instead of estimating the gear ratio from the rotation speeds of the main shaft and the countershaft, the gear ratio of the shift position detected by a shift position sensor may be used.

A driving-stability control unit 54 calculates a driving-stability control torque to be distributed to the right and left rear wheels Wr on the basis of the estimated driving torque calculated by the estimated-driving-torque calculation unit 53 and the lateral acceleration, steering angle, and wheel speeds input from the input unit 51. For example, when the slip angle of the vehicle is larger than or equal to a predetermined value, the driving-stability control unit 54 determines that vehicle behavior is unstable, and controls the rear differential gear 16 so as to reduce the torque to be distributed to the right and left rear wheels Wr and to reduce the torque to be distributed to a turning outside wheel of the right and left rear wheels Wr, thereby stabilizing the vehicle behavior.

When the vehicle speed is medium and the lateral acceleration is high, a speed-increase control unit 55 engages the speed-increasing clutch 22 of the speed-increasing device 14 so as to increase the rotation speed of the rear propeller shaft 15 with respect to the rotation speed of the front propeller shaft 13, and distributes the torque to a turning outside wheel of the right and left rear wheels Wr by the rear differential gear 16, thereby improving turning performance while avoiding understeering of the vehicle. When the vehicle speed is low or high and the lateral acceleration is low, the speed-increase control unit 55 engages the directly-coupled clutch 23 of the speed-increasing device 14, and stops the operation of increasing the rotation speed of the rear propeller shaft 15 with respect to the rotation speed of the front propeller shaft 13. In this state, the speed-increase control unit 55 distributes the torque to the turning outer wheel of the right and left rear wheels Wr by the rear differential gear 16 so as to ensure a stable turning performance.

When the driving-stability control unit 54 outputs a request to inhibit the speed increase because the speed increase may disturb the vehicle behavior, operation of the speed-increasing device 14 is inhibited.

A limited slip differential (LSD) control unit 56 compares the wheel speeds of the right and left front wheels Wf with the wheel speeds of the right and left rear wheels Wr. When the front wheels Wr slip because the frictional coefficient of a road surface on which the front wheels Wr move at the start of the vehicle is lower than the frictional coefficient of a road surface on which the rear wheels Wr move, the LSD control unit 56 calculates an LSD torque to be distributed to the rear wheels Wr in accordance with a rotation speed difference between the front wheels and the rear wheels. When the LSD torque is distributed to the rear wheels Wr by the rear differential gear 16, the slip of the front wheels Wf is reduced, and the vehicle is allowed to smoothly start moving.

A climbing control unit 58 compares an actual longitudinal acceleration detected by a longitudinal-acceleration sensor with an estimated longitudinal acceleration obtained by differentiating the vehicle speed so as to calculate a climbing angle (gradient of an uphill road) of the vehicle. Then, the climbing control unit 58 calculates a climbing start torque to be distributed to the rear wheels Wr by the rear differential gear 16 in accordance with the climbing angle in order to increase the climbing force used when the vehicle starts moving on the uphill road.

A torque addition unit 57 adds the driving-stability control torque calculated by the driving-stability control unit 54, the LSD torque calculated by the LSD control unit 56, and the climbing start torque calculated by the climbing control unit 58.

A clutch-torque limiter 60 outputs a clutch torque command obtained by limiting a target torque to be transmitted to the rear wheels Wr by the rear differential gear 16 by an upper limit in order to prevent durability from being reduced by an excessive load acting on the rear differential gear 16 at the start of the vehicle on the uphill road. This control will be described in detail below with reference to FIG. 4.

A current control unit 61 converts the clutch torque command calculated by the clutch-torque limiter 60 into a current value (PWM value) to be supplied to the electromagnetic actuators 49 of the torque distribution clutches 40 in the rear differential gear 16.

Then, a driving circuit unit 62 controls the operation of the speed-increasing device 14 on the basis of a speed increase command output from the speed-increase control unit 55, and controls the operation of the rear differential gear 16 on the basis of the current value output from the current control unit 61.

Next, with reference to FIG. 4, a description will be given of logic of torque control over the rear differential gear 16 exerted in the climbing control unit 58 and the clutch-torque limiter 60 when the vehicle start moving on an uphill road.

When the vehicle starts moving on an uphill road, the weight of the vehicle is moved from the side of the front wheels Wf to the side of the rear wheels Wr by the inclination of the road surface, and a component of gravity in a direction of the road surface tries to reverse the vehicle. Hence, the front wheels Wf serving as the main driving wheels easily slip. This tendency is pronounced particularly when the coefficient of friction of a road surface on which the front wheels Wf move is lower than the coefficient of friction of a road surface on which the rear wheels Wr move (a so-called longitudinally split μ-road).

When the front wheels Wf slip and a rotation speed difference is caused between the front wheels Wf and the rear wheels Wr in this state, the right and torque distribution clutches 40 in the rear differential gear 16 are engaged by longitudinal LSD control, thereby distributing the driving torque to the rear wheels Wr. This reduces the slip of the front wheels Wf and produces traction in the rear wheels Wr so that the vehicle can start moving.

However, if the target distribution torque to be distributed to the rear wheels Wr increases in a state in which a rapid differential rotation is produced in the right and left torque distribution clutches 40 of the rear differential gear 16, an actual driving torque to be actually transmitted to the rear wheels Wr by engagement of the right and left torque distribution clutches 40 excessively increases. Consequently, the load on the rear differential gear 16 may increase and this may reduce durability. For this reason, control for protecting the rear differential gear 16 is exerted by limiting the upper limit of the target distribution torque to be distributed to the right and left rear wheels Wr when predetermined conditions are satisfied.

Figure 4:
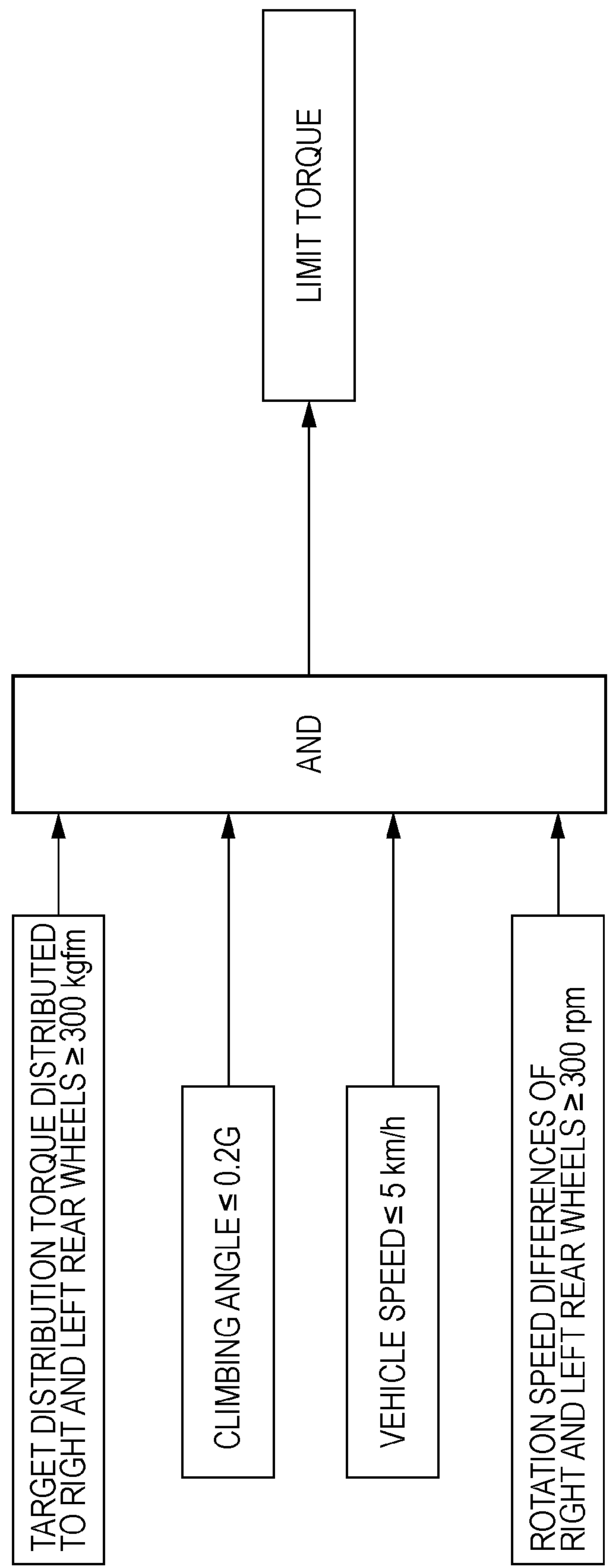
FIG. 4 illustrates logic of clutch-torque limiting control.

As shown in FIG. 4, the predetermined conditions are the following four conditions:

(1) The total target distribution torque to be transmitted to the right and left rear wheels Wr is higher than or equal to a predetermined value (300 kgfm in the embodiment).

(2) Rotation speed differences between the clutch outers 46 and the clutch inners 47 in the right and left torque distribution clutches 40 are both more than or equal to a predetermined value (300 rpm in the embodiment).

(3) The vehicle speed is lower than or equal to a predetermined value (5 km/h in the embodiment).

(4) The climbing angle converted into a gravity acceleration G is less than or equal to a predetermined value (0.2 G in the embodiment).

When all of the four conditions are satisfied, control is exerted so as to make the upper limit of the driving torque to be distributed to the rear wheels Wr lower than in a normal condition.

The above condition (2) is set for the following reason. The driving torque is limited when the coefficient of friction of the road surface on which the front wheels Wf move is different from the coefficient of friction of the road surface on which the rear wheels Wr move (a so-called longitudinally split μ-road) and the rotation speed differences between the clutch outers 46 and the clutch inners 47 of the right and left torque distribution clutches 40 in the rear differential gear 16 are both more than or equal to the predetermined value. This prevents the rear differential gear 16 from being overloaded by an excessive actual driving torque.

The above condition (3) is set because this control is originally directed to the start of the vehicle when the vehicle speed is low.

The above condition (4) is set for the following reason. If the driving torque to be distributed to the rear wheels Wr is limited in a state in which the climbing angle exceeds the predetermined value, the vehicle cannot climb on a sharp uphill road, and climbing performance may be reduced.

The above condition (4) is not essential. The driving torque to be distributed to the rear wheels Wr may be limited when only the conditions (1), (2), and (3) are satisfied.

Figure 5:
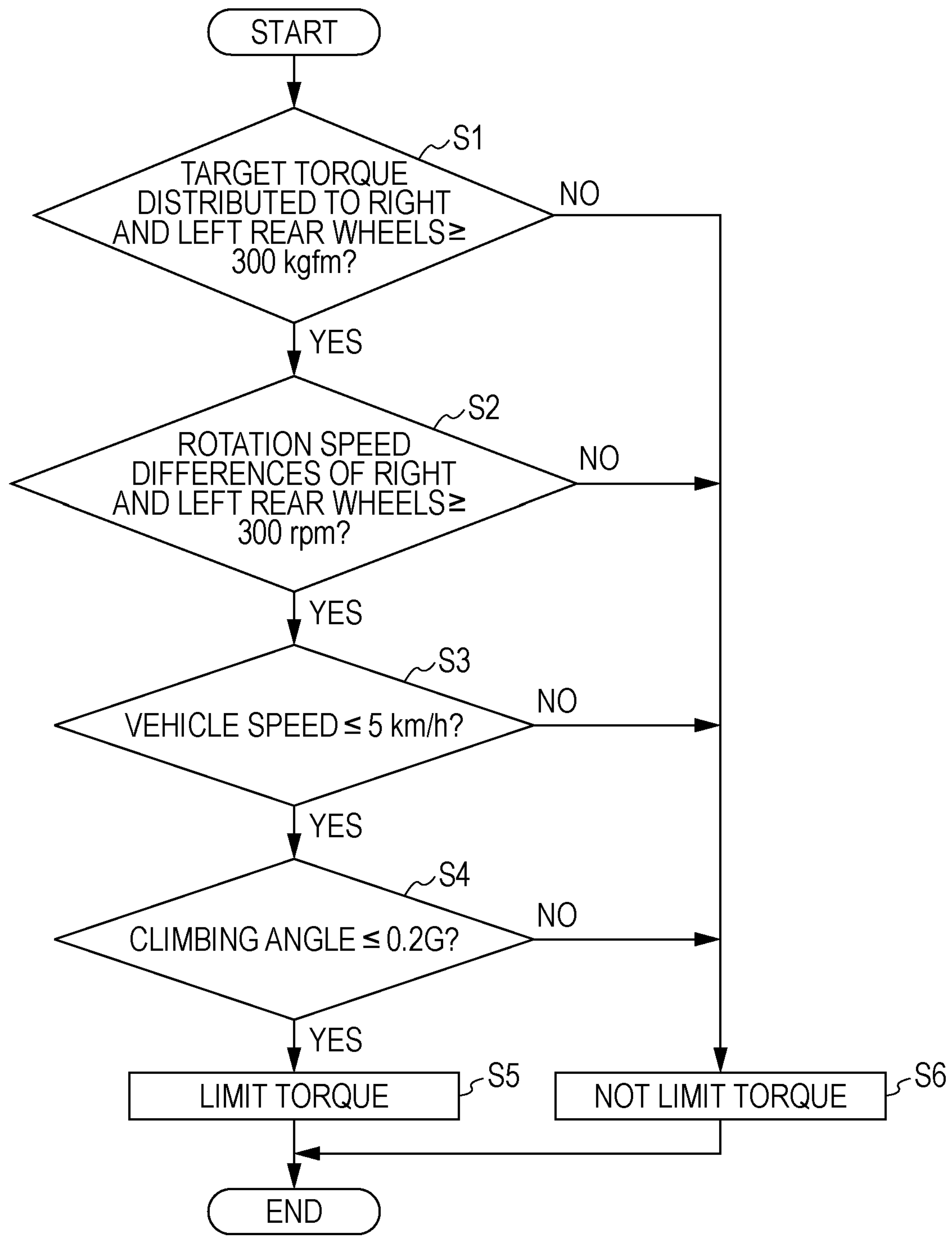
FIG. 5 is a flowchart showing the clutch-torque limiting control.

FIG. 5 is a flowchart showing the above-described operations. When the target distribution torque of the right and left rear wheels Wr is higher than or equal to 300 kgfm in Step S1, the rotation speed differences of the right and left torque distribution clutches 40 are both more than or equal to 300 rpm in Step S2, the vehicle speed is lower than or equal to 5 km/h in Step S3, and the climbing angle of the road surface is less than or equal to 0.2 in Step S4, the upper limit of the target distribution torque is limited in Step S5. When any of the conditions of Steps S1 to S4 is not satisfied, the upper limit of the target distribution torque is not limited in Step S6. Therefore, durability of the rear differential gear 16 is prevented from being reduced by distribution of an excessive actual driving torque to the rear wheels Wr without reducing driving ability on the longitudinally split μ-road and climbing ability on the uphill road. Moreover, since there is no need to reduce the output torque from the engine E, reduction of starting performance of the vehicle can be minimized.

While the embodiment of the present invention has been described above, various design variations are possible without departing from the scope of the invention.

For example, the driving source of the embodiment of the present invention is not limited to the engine E of the embodiment, and may be a motor generator or a combination of the engine E and the motor generator.

The vehicle-speed detector 52*a* may estimate the vehicle speed from the wheel speeds of the front wheels Wf and the rear wheels Wr.

While the four-wheel drive vehicle of the embodiment includes the speed-increasing device 14, the speed-increasing device 14 is not always necessary and may be omitted.

While the four-wheel drive vehicle of the embodiment adopts the automatic transmission T, it can adopt a manual transmission or a continuously variable transmission (CVT).

In the embodiment of the present invention, the torque limiter limits the upper limit of the sub-driving-wheel distribution torque to be transmitted from the driving source to the right and left sub-driving wheels via the right and left torque distribution clutches when the sub-driving wheel distribution torque calculated by the sub-driving-wheel distribution-torque calculator is higher than or equal to a predetermined value, both a rotation speed difference of the left torque distribution clutch and a rotation speed difference of the right torque distribution clutch are larger than or equal to a predetermined value, and the vehicle speed detected by the vehicle-speed detector is lower than or equal to a predetermined value. Hence, it is possible to prevent durability from being reduced by an excessive actual driving torque produced in the sub-driving wheels when the main driving wheels slip at the start of the vehicle. Since there is no need to reduce the output torque of the driving source at this time, reduction of starting performance of the vehicle can be minimized.

In particular, the torque limiter limits the upper limit of the sub-driving-wheel distribution torque only when both the rotation speed difference of the left torque distribution clutch and the rotation speed difference of the right torque distribution clutch are larger than or equal to the predetermined value. Thus, when one of the right and left sub-driving wheels on the road surfaces having different coefficients of friction slips and only the rotation speed difference of one of the right and left torque distribution clutches becomes larger than or equal to the predetermined value, driving ability can be ensured while maintaining the sub-driving-wheel distribution torque.

Preferably, the torque distribution control apparatus of the embodiment of the present invention further includes a road-gradient detector configured to detect a gradient of the road surface. The torque limiter may limit the upper limit of the sub-driving-wheel distribution torque when the gradient of the road surface detected by the road-gradient detector is smaller than or equal to a predetermined value.

In this case, since the torque limiter limits the upper limit of the sub-driving-wheel distribution torque when the gradient of the road surface detected by the road-gradient detector is larger than or equal to the predetermined value, reduction of climbing ability can be avoided.

An engine E of an embodiment corresponds to the driving source of the present invention, an ESC electronic control unit Uc of the embodiment corresponds to the wheel-speed detector of the invention, front wheels Wf of the embodiment correspond to the main driving wheels of the invention, rear wheels Wr of the embodiment correspond to the sub-driving wheels of the invention, a vehicle-speed detection sensor 52*a* of the embodiment corresponds to the vehicle-speed detector of the invention, an LSD control unit 56 of the embodiment corresponds to the sub-driving-wheel distribution-torque calculator of the embodiment, a climbing control unit 58 of the embodiment corresponds to the road-gradient detector of the invention, and a clutch-torque control unit 60 of the embodiment corresponds to the torque limiter of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A torque distribution control apparatus for a four-wheel drive vehicle, comprising:

a vehicle-speed detector configured to detect a vehicle speed of the four-wheel drive vehicle which includes:

right and left main driving wheels to which a driving torque output from a driving source is directly transmitted; and right and left sub-driving wheels to which the driving torque is transmitted via right and left torque distribution clutches;

a wheel-speed detector configured to detect wheel speeds of the main driving wheels and the sub-driving wheels;

a sub-driving-wheel distribution-torque calculator configured to calculate a sub-driving-wheel distribution torque in accordance with a rotation speed difference between the main driving wheels and the sub-driving wheels calculated based on an output from the wheel-speed detector;

a torque limiter configured to limit an upper limit of the sub-driving-wheel distribution torque when the sub-driving-wheel distribution torque calculated by the sub-driving-wheel distribution-torque calculator is higher than or equal to a first predetermined value, when both a rotation speed difference of the left torque distribution clutch and a rotation speed difference of the right torque distribution clutch are larger than or equal to a second predetermined value, and when the vehicle speed detected by the vehicle-speed detector is lower than or equal to a third predetermined value; and a controller configured to control, by changing engaging forces of the right and left torque distribution clutches in accordance with a driving state of the four-wheel drive vehicle, the sub-driving-wheel distribution torque to be transmitted to the right and left sub-driving wheels.

2. The torque distribution control apparatus according to claim 1, further comprising:

a road-gradient detector configured to detect a gradient of a road surface, wherein the torque limiter limits the upper limit of the sub-driving-wheel distribution torque when the sub-driving-wheel distribution torque calculated by the sub-driving-wheel distribution-torque calculator is higher than or equal to the first predetermined value, when both a rotation speed difference of the left torque distribution clutch and a rotation speed difference of the right torque distribution clutch are larger than or equal to the second predetermined value, when the vehicle speed detected by the vehicle-speed detector is lower than or equal to the third predetermined value, and when the gradient of the road surface detected by the road-gradient detector is smaller than or equal to a fourth predetermined value.

3. The torque distribution control apparatus according to claim 1, wherein the vehicle-speed detector is configured to detect the vehicle speed of the four-wheel drive vehicle from a rotation speed of a gear in an automatic transmission.

4. The torque distribution control apparatus according to claim 1, wherein the first predetermined value is 300 kgfm.

5. The torque distribution control apparatus according to claim 1, wherein the second predetermined value is 300 rpm.

6. The torque distribution control apparatus according to claim 1, wherein the third predetermined value is 5 km/h.

7. A torque distribution control apparatus for a four-wheel drive vehicle, comprising:

vehicle-speed detection means for detecting a vehicle speed of the four-wheel drive vehicle which includes:

right and left main driving wheels to which a driving torque output from a driving source is directly transmitted; and right and left sub-driving wheels to which the driving torque is transmitted via right and left torque distribution clutches;

wheel-speed detection means for detecting wheel speeds of the main driving wheels and the sub-driving wheels;

sub-driving-wheel distribution-torque calculation means for calculating a sub-driving-wheel distribution torque in accordance with a rotation speed difference between the main driving wheels and the sub-driving wheels calculated based on an output from the wheel-speed detection means;

torque limiting means for limiting an upper limit of the sub-driving-wheel distribution torque when the sub-driving-wheel distribution torque calculated by the sub-driving-wheel distribution-torque calculation means is higher than or equal to a first predetermined value, when both a rotation speed difference of the left torque distribution clutch and a rotation speed difference of the right torque distribution clutch are larger than or equal to a second predetermined value, and when the vehicle speed detected by the vehicle-speed detection means is lower than or equal to a third predetermined value; and controlling means for controlling, by changing engaging forces of the right and left torque distribution clutches in accordance with a driving state of the four-wheel drive vehicle, the sub-driving-wheel distribution torque to be transmitted to the right and left sub-driving wheels.

8. The torque distribution control apparatus according to claim 7, further comprising:

road-gradient detecting means for detecting a gradient of a road surface, wherein the torque limiting means limits the upper limit of the sub-driving-wheel distribution torque when the sub-driving-wheel distribution torque calculated by the sub-driving-wheel distribution-torque calculation means is higher than or equal to the first predetermined value, when both a rotation speed difference of the left torque distribution clutch and a rotation speed difference of the right torque distribution clutch are larger than or equal to the second predetermined value, when the vehicle speed detected by the vehicle-speed detection means is lower than or equal to the third predetermined value, and when the gradient of the road surface detected by the road-gradient detecting means is smaller than or equal to a fourth predetermined value.

9. The torque distribution control apparatus according to claim 7, wherein the vehicle-speed detection means detects the vehicle speed of the four-wheel drive vehicle from a rotation speed of a gear in an automatic transmission.

10. The torque distribution control apparatus according to claim 7, wherein the first predetermined value is 300 kgfm.

11. The torque distribution control apparatus according to claim 7, wherein the second predetermined value is 300 rpm.

12. The torque distribution control apparatus according to claim 7, wherein the third predetermined value is 5 km/h.

13. A four-wheel drive vehicle comprising:

right and left main driving wheels to which a driving torque output from a driving source is directly transmitted;

right and left sub-driving wheels to which the driving torque is transmitted via right and left torque distribution clutches; and a torque distribution control apparatus comprising:

a vehicle-speed detector configured to detect a vehicle speed of the four-wheel drive vehicle;

a wheel-speed detector configured to detect wheel speeds of the main driving wheels and the sub-driving wheels;

a sub-driving-wheel distribution-torque calculator configured to calculate a sub-driving-wheel distribution torque in accordance with a rotation speed difference between the main driving wheels and the sub-driving wheels calculated based on an output from the wheel-speed detector;

a torque limiter configured to limit an upper limit of the sub-driving-wheel distribution torque when the sub-driving-wheel distribution torque calculated by the sub-driving-wheel distribution-torque calculator is higher than or equal to a first predetermined value, when both a rotation speed difference of the left torque distribution clutch and a rotation speed difference of the right torque distribution clutch are larger than or equal to a second predetermined value, and when the vehicle speed detected by the vehicle-speed detector is lower than or equal to a third predetermined value; and a controller configured to control, by changing engaging forces of the right and left torque distribution clutches in accordance with a driving state of the four-wheel drive vehicle, the sub-driving-wheel distribution torque to be transmitted to the right and left sub-driving wheels.

14. The four-wheel drive vehicle according to claim 13, further comprising:

a road-gradient detector configured to detect a gradient of a road surface, wherein the torque limiter limits the upper limit of the sub-driving-wheel distribution torque when the sub-driving-wheel distribution torque calculated by the sub-driving-wheel distribution-torque calculator is higher than or equal to the first predetermined value, when both a rotation speed difference of the left torque distribution clutch and a rotation speed difference of the right torque distribution clutch are larger than or equal to the second predetermined value, when the vehicle speed detected by the vehicle-speed detector is lower than or equal to the third predetermined value, and when the gradient of the road surface detected by the road-gradient detector is smaller than or equal to a fourth predetermined value.

15. The four-wheel drive vehicle according to claim 13, wherein the vehicle-speed detector is configured to detect the vehicle speed of the four-wheel drive vehicle from a rotation speed of a gear in an automatic transmission.

16. The four-wheel drive vehicle according to claim 13, wherein the first predetermined value is 300 kgfm.

17. The four-wheel drive vehicle according to claim 13, wherein the second predetermined value is 300 rpm.

18. The four-wheel drive vehicle according to claim 13, wherein the third predetermined value is 5 km/h.

* * * * *